UNITED STATES PATENT OFFICE.

BUTLER G. NOBLE, OF BROOKLYN, NEW YORK.

IMPROVEMENT IN TREATING OIL-WELLS TO REMOVE OBSTRUCTIONS TO THE FLOW OF OIL.

Specification forming part of Letters Patent No. 105,590, dated July 19, 1870; reissue No. 4,770, dated February 27, 1872.

*To all whom it may concern:*

Be it known that I, BUTLER G. NOBLE, of the city of Brooklyn, in the county of Kings and State of New York, have invented a new and useful Mode or Process for Increasing the Yield of Petroleum Oil-Wells; and I do hereby declare that the following is a full and exact description thereof, to wit:

The nature of my invention consists in removing paraffine or other obstructing matters from the seams, issues, or natural ducts of such wells, by the production and employment of an intense and long-continued heat at the productive points within the well.

To enable others skilled in the art to adopt and use my invention, I will proceed to describe the mode by which I accomplish the results desired.

Petroleum oil-wells are bored in the rock-formation to a depth of from two hundred to fifteen hundred feet, and are usually from three to six inches in diameter. In the oil regions of Pennsylvania the oil is found in the sand rocks. These sand rocks occur in separate stratums, and are designated as the first, second, and third sand rock. The most abundant oil-flows are found in the third sand rock. This rock is composed almost entirely of water-worn quartz pebbles, mingled with coarse gravel and sand of the same material. The absence of all mineral-binding matter renders it very porous and permeable. In thickness it varies from a few inches to forty feet. The productive portion of an oil-well is that part which comprises the issues, seams, or other natural ducts, through which the oil finds its way into the well-bore. These inflows are usually in groups occupying a limited portion of the well. The vertical space in which these oil-issues occur I denominate the "range of inflow." It often includes the whole extent of this sand-rock. Persons working oil-wells know these points of oil-inflow, and, by a record kept when the well is bored, can determine with accuracy the location and extent of all oil-flows, gas-flows, and water-courses.

As it is desirable in working oil-wells to exclude water, most wells are provided with an iron casing, which extends from the top, where it is made fast, down to a point below the lowest water-flow. This casing, which is considerably smaller than the well-bore, is provided with a packing at or near its lower extremity, which, filling the annular space between the casing and the well-walls at that point, shuts off all water. Below the casing the well-walls are bare, and this vertical space includes all the available productive portion of the well. The "tubing" through which the oil is raised to the surface, extends from the top, down through the casing, to near the bottom of the oil-bearing rock, terminating in the working barrel or pump. The "tubing" is much smaller than the casing, and, with its appendages, can be readily removed and replaced, while the casing remains, being seldom removed except for repairs. Oil-wells which are not cased, are provided with a packing, which surrounds the "tubing," filling the space between it and well-wall at the proper point for excluding the water. The removal of the "tubing" in such wells involves the breaking up of the packing, and the consequent introduction of water.

Many wells, after yielding oil largely, gradually diminish in productiveness, and ultimately cease to produce in paying quantities. This failure in yield is not always because of exhaustion of the supply, but often results from the clogging up of the seams or natural ducts leading into the well-bore, by the deposition of paraffine or other carbonaceous matters. Paraffine is of wax-like structure, and when refined is about of the consistency of spermaceti. It melts at a temperature considerably below the boiling-point of water, and when melted dissolves instantly in petroleum at ordinary temperature. It is deposited from petroleum at low temperatures. As the carbureted-hydrogen gas, almost always present in oil-wells, is under pressure within the cavities of the rock, when it reaches the vicinity of the well-bore it gradually expands, producing a low temperature favorable to the deposition of paraffine. It is obvious that these depositions must be for the most part in the apertures of the oil-ducts within the well, or contiguous thereto. To remove these obstructions and restore the yield of oil many modes have been devised. That which is now generally adopted consists in pouring into the well naphtha, or other light hydrocarbon, for the purpose of dissolving the paraffine. The method is attended with some success, but is wanting in thoroughness. Attempts have been made to force hot air and gases into wells; but these modes involve massive machinery and great expense, and as often the wells contain many hundred feet of fluid, the heat is taken up by the well and its contents long before the points of obstruction are reached. The torpedo for exploding gunpowder, nitro-glycerine, and similar agents, for the purpose of fracturing the well-walls for a considerable distance around the well, thus enlarging the diameter of the bore, removing obstructions, and breaking into new crevices, has been used with varied results. The violent rupture of the surrounding walls may open new fissures, but may also close up the old. Again, the sudden crash of the explosion, made locally effective by the inertia of a fluid column above, is often followed by the caving in and filling up of the well through a great extent of the oil-bearing rock. Hence, while the explosive process is effective where a breaking and shattering of the well-walls are desirable, and while the production is often increased by this mode, yet wells have been destroyed, and have ceased to produce, when subjected to this violence. The use of nitro-glycerine, dynamite, or other highly-explosive agents, is always attended with risk and danger.

The principal and distinguishing characteristic of my invention is the removal of paraffine and other obstructing matters from the seams, issues, or in-flows of oil-wells by the combustion, without explosion, of slow-burning compositions, so disposed as to produce an intense and long-continued heat and pressure at the points within the well where these obstructions are likely to occur. To effect this result I construct what I denominate a volcanic case, cylindrical in form, of iron or other metal or material, of such diameter as the size of the well admits, and of any convenient length. There should be an annular space of about an inch around the volcanic case when placed in the well. As the wells often contain four or five hundred feet of fluid, the case should be made of such strength as will withstand the pressure. For safety I make them capable of sustaining a pressure of from twelve to eighteen hundred pounds to the square inch. The top and bottom of the case are closed by removable caps. Near the bottom I make from three to six lateral vents, whose size will depend upon the amount of local force and pressure required in a given time. The area of ventage should be less than the area of burning surface within. The vents may be made laterally at the top, bottom, or middle of the case, as desired. If placed in the middle, they should be proportionably larger, as the burning surface would be thereby doubled. I generally prefer to use volcanic cases twelve feet long and two inches interior diameter. The ratio of ventage to burning surface is nearly in the proportion of one to four. The volcanic case I fill with a slow-burning composition, analogous to that employed for filling rockets, and well known to persons skilled in pyrotechny. Common granulated gunpowder, reduced to the fine powder known as "meal powder," mixed with from five to twenty per cent. of powdered charcoal, forms a safe and reliable filling; but I prefer a compound of nitrate of soda, or nitrate of potash, sixteen parts, and powdered charcoal four to six parts. These mixtures are of great variety and well known; and I do not confine myself to any definite composition. The object to be attained is the slow, cumulative production of the hot gases, and the avoidance of all explosion or detonation. The filling should be well rammed to insure even and regular combustion from a definite surface.

The action of slow-burning powders, when ignited, is unlike that of common granulated gunpowder, gun-cotton, nitro-glycerine, or other highly-explosive agents. These latter, especially when fired by detonation, evolve immense volumes of hot gases instantaneously, rupturing and breaking all contiguous resisting matter. On the other hand, the slow-burning compounds, giving out their resulting gases progressively, with gradually-increasing heat and force, act for a long time, and can be restrained and directed so as to reach more distant localities.

The case when filled, is closed securely and made impervious to water or oil. The vents are covered externally by placing over them small patches of metal or other suitable material, and are well secured against leakage by proper packing. For igniting the charge I employ any of the well-known methods of igniting cartridges under water; but I prefer the electric fuse for certainty and convenience. The fuse, provided with the usual insulated wire connections, is placed within the volcanic case, near the vents. The fuse-wires pass out of the vents or other apertures well packed. The volcanic is provided with a suitable drop-line, with which it can be lowered down into the well and removed therefrom. This line may be of iron, copper, or other metal, properly insulated, and thus serve also as an electric conductor; or the electric conductor may be inclosed in the line, or may be separate. The mode of using the volcanic is as follows: The well is prepared for treatment by drawing the tubing and its appendages. Usually the fluids of the well will then fill up the well-bore to a point which varies in different cases. As the natural fluids of the well are the best solvents of paraffine, I prefer that they should be present in sufficient quantity to cover the whole oil-bearing rock, and a high oil-column will contribute much to the successful treatment of the well, by confining and directing the slowly-evolved gases to points distant from the interior well-surface, and within the adjacent porous rock. The volcanic is now attached to the drop-line, and, the electric connections being properly made, it is lowered down into the well to a point within or immediately below the range of in-flow. It is then ignited by a proper electrical apparatus. As soon as combustion takes place, the vent patches are thrown off, and the hot gases issue with great force from the lateral vents, displacing the surrounding fluid, and impinging direct against the well-walls. The volcanic is now, while burning, moved slowly upward and downward through the whole extent of the range of in-flow, thus subjecting the interior surface of the well-bore continuously to the direct heat and force of the hot-gas blast, until it is exhausted. As a natural result, aggregations of paraffine adhering to the well-walls are melted, immediately dissolved, and held in solution. The continuous force of the slowly-evolved gases, especially if aided by the pressure of a column of oil or other fluid four or five hundred feet in height, is such as to render the heat effective within and through the seams and oil-issues of the sand-rock for many yards distant. The minute interstices of the porous rock are permeated, old issues are opened, new or imperfect ones are enlarged and cleansed, and the way prepared for a more abundant returning oil-flow. A volcanic case twelve feet long and two inches interior diameter, prepared in the manner hereinbefore set forth, burning from a single surface, will operate from twenty-four minutes to half an hour. During this burning there is no explosion or local violence—no enlarging of the well-bore by fracturing the walls. The ruptive force sufficient to accomplish the shattering of the well-walls would be equal to the instant impact within confined limits of many tons to the inch. But the gases from the volcanic are of low tension, slowly evolved, and their accumulated pressure can scarcely exceed that of the fluid column above, which, if of oil, would only equal about forty pounds to the inch for every hundred feet of vertical extent. Practically the heat is at first taken up by the well-walls and surrounding fluid; the evolved gases are in part condensed; but, as they are continuously produced, the condensation is soon diminished, the fluids expand, become aerated, much agitation ensues, and the whole fluid column is surged up and down through the well until the volcanic is exhausted. When the burning ceases the volcanic is drawn out. The treatment may be made more thorough, if desired, by the immediate introduction of others. Whatever the result may be, no injury is done to the well; no foreign matter is left in it—even the residuum of the volcanic itself is found adhering to the interior of its case.

The expense attending this mode of treatment is comparatively small. Volcanic cases are filled and used many times over. The material for the burning is cheap, easily prepared, and can always be handled and transported with safety.

I do not confine myself to the particular form of volcanic case herein described, nor to any of the materials or compounds used for filling the cases, nor to the mode of igniting the charge; and I make no claim for any of the appliances used in my mode of treating oil-wells, which are in themselves old and well known.

What I claim as my invention, and desire to secure by Letters Patent, is—

The use of slow-burning compounds, without explosion, for the production of long-continued heat and pressure in oil-wells, substantially in the manner and for the purposes herein set forth.

BUTLER G. NOBLE.

In presence of—
ISAAC S. WATERS,
EZRA B. TUTTLE.